US007564400B2

(12) United States Patent
Fukuda

(10) Patent No.: US 7,564,400 B2
(45) Date of Patent: Jul. 21, 2009

(54) SPREAD SPECTRUM RADAR APPARATUS

(75) Inventor: Takeshi Fukuda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/212,321

(22) Filed: Sep. 17, 2008

(65) Prior Publication Data

US 2009/0074031 A1 Mar. 19, 2009

(30) Foreign Application Priority Data

Sep. 19, 2007 (JP) ............................. 2007-242579

(51) Int. Cl.
*G01S 13/26* (2006.01)
(52) U.S. Cl. ................... 342/145; 342/70; 342/109; 342/114; 342/115; 342/135; 342/189; 342/195; 342/201; 342/202; 375/130
(58) Field of Classification Search ............ 342/70–72, 342/89, 109, 114–115, 135, 145, 189, 194–196, 342/200–204; 375/130
See application file for complete search history.

(56) References Cited

U.S. PATENT DOCUMENTS

| 4,325,138 | A | * | 4/1982 | Zscheile, Jr. ............... 375/130 |
| 4,972,430 | A | * | 11/1990 | Cantwell ................... 375/130 |
| 5,731,781 | A | | 3/1998 | Reed |
| 5,930,292 | A | | 7/1999 | Willis |
| 6,788,730 | B1 | * | 9/2004 | Richards et al. ............. 375/138 |
| 2003/0043934 | A1 | * | 3/2003 | Roberts ..................... 375/316 |
| 2003/0095609 | A1 | * | 5/2003 | Cowie et al. ................ 375/316 |
| 2004/0190597 | A1 | * | 9/2004 | Cowie et al. ................ 375/138 |
| 2004/0227661 | A1 | * | 11/2004 | Godsy ......................... 342/70 |
| 2005/0195884 | A1 | | 9/2005 | Nakano et al. |
| 2007/0109175 | A1 | | 5/2007 | Fukuda |
| 2007/0285307 | A1 | | 12/2007 | Nishijima et al. |
| 2008/0075153 | A1 | * | 3/2008 | Roberts et al. .............. 375/220 |

(Continued)

FOREIGN PATENT DOCUMENTS

EP 1865337 A1 * 12/2007

(Continued)

OTHER PUBLICATIONS

English language Abstract of JP 7-12930 A.

(Continued)

*Primary Examiner*—John B Sotomayor
(74) *Attorney, Agent, or Firm*—Greenblum & Bernstein, P.L.C.

(57) ABSTRACT

It is an object of the present invention to prevent the sensitivity of radar apparatus from falling. A spread spectrum radar apparatus which detects an object, includes a carrier wave oscillator which generates a carrier wave, transmission unit which transmits a spread signal which is the carrier wave spread using a first PN code, an intermediate demodulated signal generating unit which receives a reflected wave which is the spread signal reflected from the object, and despreads the reflected wave using a delayed second PN code that has a cyclically reversed logical value of the first PN code, to generate an intermediate demodulated signal, a low-pass filter through which a specific frequency component of the intermediate demodulated signal passes, and a sampling unit which samples an output signal from the low-pass filter, and the sampling unit samples the output signal in synchronization with the cycle of the reversal.

10 Claims, 8 Drawing Sheets

U.S. PATENT DOCUMENTS

| | | |
|---|---|---|
| 2008/0204307 A1 | 8/2008 | Fukuda |
| 2009/0003412 A1* | 1/2009 | Negoro et al. ............... 375/130 |
| 2009/0015464 A1* | 1/2009 | Fukuda ...................... 342/194 |
| 2009/0073029 A1* | 3/2009 | Nishijima et al. ........... 342/200 |
| 2009/0074031 A1* | 3/2009 | Fukuda ...................... 375/130 |

FOREIGN PATENT DOCUMENTS

| | | |
|---|---|---|
| JP | 7-12930 A | 1/1995 |
| JP | 10-54874 A | 2/1998 |

OTHER PUBLICATIONS

English language Abstract of JP 10-54874 A.

U.S. Appl. No. 11/816,794 to Fukuda, which was filed on Aug. 21, 2007.

U.S. Appl. No. 12/038,198 to Negoro et al., which was filed on Feb. 27, 2008.

* cited by examiner

Prior Art

FIG. 1

| Shift amount | 0 | 0 | 1 | 0 | 1 | 1 | 1 | Correlation value |
|---|---|---|---|---|---|---|---|---|
| 0 | 0 | 0 | 1 | 0 | 1 | 1 | 1 | 7 |
| 1 | 1 | 0 | 0 | 1 | 0 | 1 | 1 | -1 |
| 2 | 1 | 1 | 0 | 0 | 1 | 0 | 1 | -1 |
| 3 | 1 | 1 | 1 | 0 | 0 | 1 | 0 | -1 |
| 4 | 0 | 1 | 1 | 1 | 0 | 0 | 1 | -1 |
| 5 | 1 | 0 | 1 | 1 | 1 | 0 | 0 | -1 |
| 6 | 0 | 1 | 0 | 1 | 1 | 1 | 0 | -1 |

SPREAD SPECTRUM RADAR APPARATUS

CROSS-REFERENCE TO RELATED APPLICATIONS

Applicant claims foreign priority benefit under 35 U.S.C. § 119(b) of Japanese Application No. 2007-242579, filed Sep. 19, 2007, which is hereby incorporated by reference.

BACKGROUND OF THE INVENTION (1) Field of the Invention

The present invention relates to radar apparatuses using spread spectrum scheme, and particularly to a high performance spread spectrum radar apparatus which is inexpensive and has a wide detectable range.

(2) Description of the Related Art

In recent years, technology for radar apparatuses equipped on automobile (hereinafter referred to as in-vehicle radar apparatus) has been actively developed. The in-vehicle radar apparatus aims at improvement in safety such as crash avoidance and improvement in driving convenience including support when the user starts a car backwards, and is used for detecting preceding vehicle and obstacles in the back, for example. For these purposes, it is necessary to suppress the influence of unnecessary waves such as interference caused by electromagnetic waves from an in-vehicle radar apparatus of the same type equipped in another vehicle.

In order to solve the problem, a radar apparatus using the spread spectrum scheme (hereinafter referred to as a spread spectrum radar apparatus) has been proposed (See Patent Reference 1: Japanese Unexamined Patent Application Publication No. 7-12930).

In the spread spectrum radar apparatus, transmission waves are spread using a pseudo noise code (hereinafter referred to as PN code), and the receiver despreads the transmission waves using the same PN code used for modulating the transmission waves. This restrains waves modulated using different codes and waves radiated from a radar apparatus using other schemes which does not involve code modulation in the receiver, and thus suppresses interference. Furthermore, since the transmission waves are frequency spread using the PN code, electricity per frequency unit may be reduced, and the effect to other wireless system may also be lowered. Moreover, the relationship between distance resolution and the maximum detectable range may be freely set by adjusting the chip rate of PN code and the cycle of code. Furthermore, the peak electricity of the spread spectrum radar apparatus is not large compared to a radar apparatus using the pulse scheme since the waves can be sequentially transmitted. Thus, the spread spectrum radar apparatus is advantageous in reduction of the amount of electricity necessary for a high-frequency circuit and providing inexpensive radar apparatuses.

A radar apparatus having a high-frequency circuit simplified by using a common local oscillator on the transmission side and the reception side, and in which the polarity of PN code is reversed at an appropriate time has been proposed as a specific structure of the spread spectrum radar apparatus (see Patent Reference 2: Japanese Unexamined Patent Application Publication No. 10-54874). The reception unit of the radar apparatus in Patent Reference 2 is configured to quadrature-demodulate the received signal directly using transmission carrier wave. Reversing PN codes used for despreading at an appropriate interval reverses polarity of the quadrature-demodulated output at the appropriate interval, makes the quadrature-demodulate output as alternating signal and the influence of direct-current offset is eliminated. As described above, the radar apparatus is a good radar apparatus which is not subject to the direct current offset caused by the variation in characteristic of semiconductor devices and variation of external temperature.

Operations of the radar apparatus when reversing the PN code is described specifically using an M-sequence code as the PN code.

The M-sequence code is a PN code which includes "0" and "1" as logical values, and the number of "1" included in one cycle is always one more than the number of "0". In addition, as shown in FIG. 1 the M-sequence code has good correlation characteristics. FIG. 1 shows the correlation characteristics of an example M-sequence code which has 7 bits per cycle. As shown in FIG. 1, when calculating correlation of one M-sequence code and the M-sequence code shifted to a few bits, the correlation value is the peak value, or 7 when the shift amount is 0, and the correlation value is −1 in any other case. Note that the correlation value is calculated by subtracting the number of difference from the number of matching two. The correlation value is calculated by converting "0" in the M-sequence code to "−1", and calculating the product sum.

As described above, the correlation value takes a large value only when an M-sequence code and another M-sequence code match, and the correlation value is extremely small in other cases. In the conventional technology, distance to an object can be detected using the correlation characteristics.

However, the conventional technology has a problem that the sensitivity of the radar apparatus falls due to transient impulse noise generated in the demodulated output, even in the non-correlated signal which is essentially suppressed with correlation characteristics of the PN code, continuity of the code is lost in the instant that the PN code is reversed. The problem is hereafter described in detail.

The technology described in Patent Reference 2 describes reversal of PN code for suppressing the influence of direct current offset. As shown in FIG. 2, there could be irregularity in the number of "0" and "1" when the cycle for obtaining the correlation characteristics includes the instant when the M-sequence code is reversed. In this case, the distinct correlation as shown in FIG. 1 is not obtained. As a result, when the spread signal spread using the PN code is despread using the reversed PN code, an impulse noise as shown in FIG. 3 is generated in the signal after despread or quadrature-demodulation. The impulse noise shown in FIG. 3 is generated in the instant when the PN code is reversed.

The waveform shown in FIG. 3 shows the output waveform, for example, when the PN code passes through a low-pass filter of a fully-wide bandwidth when the cycle of PN code is 2047 bit, the chip rate is 2500 Mcps and the frequency for reversing the PN code is 50 kHz. In this example, components approximately over 1.2 MHz are fully suppressed. Amplitude component determined by the correlation characteristics of the PN code is generated in the part where the impulse noise is eliminated. As shown in FIG. 3, the output waveform is reversed according to reversal and non-reversal of PN code. Furthermore, when there is an object reflecting the spread signal, a reflected wave of amplitude according to the reflection intensity of the object and the distance from the object to the radar apparatus.

For example, as shown in FIG. 3, when the first reflected wave having larger amplitude than the amplitude of the impulse noise, it is possible to detect the reflected wave in the radar apparatus. Meanwhile, in the case of the second reflected wave having smaller amplitude than the amplitude of the impulse noise, it is difficult to detect the reflected wave.

Thus, the influence of the impulse noise causes a problem that the sensitivity of the radar apparatus falls, for example, reduction in the maximum detectable range.

SUMMARY OF THE INVENTION

In view of the above-mentioned problem, it is an object of the present invention to provide a spread spectrum radar apparatus which prevents fall of radar apparatus sensitivity, for example, reduction in the maximum detectable range.

In order to achieve the above-mentioned object, the spread spectrum radar apparatus according to the present invention is a spread spectrum radar apparatus which detects an object by transmitting and receiving a spread signal obtained by spectrum-spreading, the spread spectrum radar apparatus including: an oscillating unit which generates a carrier wave; a code reversal unit which outputs a second pseudo noise code that has a cyclically reversed logical value of a first pseudo noise code; a transmission unit which transmits a spread signal which is the carrier wave that has been spread using one of the first pseudo noise code and the second pseudo noise code; an intermediate demodulated signal generating unit which receives a reflected wave which is the spread signal reflected from the object after the spread signal is transmitted by the transmission unit, and to despread the reflected wave using a code which is delayed code of the other one of the first pseudo noise code and the second pseudo noise code, to generate an intermediate demodulated signal; a filter through which a specific frequency component of the intermediate demodulated signal passes; and a sampling unit which samples an output signal from the filter, in which the sampling unit is which sample the output signal in synchronization with the cycle of the reversal.

With this, suppressing the impulse noise generated in the instant when the PN code is reversed and sampling the output signal from the filter at the timing when the impulse noise is the local minimum prevents fall of radar apparatus sensitivity, for example, reduction in the maximum detectable range.

In addition, the spread spectrum radar apparatus may include a clock generator which generates a clock signal; and a frequency divider which generates an iteration code by dividing the frequency of the clock signal into half, in which the code reversal unit is which reverse the first pseudo noise code according to the logical value of the iteration code to output the second pseudo noise code, and the sampling unit is which sample the output signal in synchronization with the clock signal.

This allows the reversal cycle of the code and sampling cycle to synchronize easily.

In addition, the spread spectrum radar apparatus may further include a delaying unit which delays the clock signal, in which the delaying unit delays the clock signal for a period in which processing by the filter is performed and outputs the delayed clock signal to the sampling unit, and the sampling unit samples the output signal in synchronization with the delayed clock signal.

This allows synchronization of the timing of sampling with the timing when the impulse noise is suppressed.

In addition, the filter may have a characteristic that an impulse response takes a finite value when time t=0, and that the absolute value of $\pm nT-T/10 < t < \pm nT+T/10$ is local minimum, where n is a natural number and where the half of the clock signal is T.

This allows suppressing the influence of the impulse noise by filtering the signal in which the impulse noise is generated using a filter with a simple configuration.

In addition, the filter may be a Nyquist filter whose sampling frequency is a frequency twice as much as the frequency of the clock signal or a raised cosine filter.

In addition, the spread spectrum radar apparatus may include an analog-digital converter which converts the intermediate demodulated signal which is an analog signal into a digital signal, at a predetermined sampling frequency, in which the filter is a finite impulse response digital filter.

Digitalizing the signal in which the impulse noise is generated allows implementation of a radar apparatus having a digital filter that has a simpler configuration than that of an analog filter.

In addition, the spread spectrum radar apparatus may include a low-pass filter whose cutoff frequency is a half of the sampling frequency, in which the analog-digital converter converts the intermediate demodulated signal which passed through the low-pass filter into the digital signal.

This can suppress folding noise generated upon analog-digital conversion.

As described above, the spread spectrum radar apparatus according to the present invention can provide a spread spectrum radar apparatus which prevents fall of radar apparatus sensitivity, for example, reduction in the maximum detectable range.

FURTHER INFORMATION ABOUT TECHNICAL BACKGROUND TO THIS APPLICATION

The disclosure of Japanese Patent Application No. 2007-242579 filed on Sep. 19, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1 is a chart showing correlation of the M-sequence codes;

DESCRIPTION OF THE PREFERRED EMBODIMENT

The spread spectrum radar apparatus according to the present invention suppresses the influence of direct current offset by reversing the logical value of the PN code used for spreading or despreading and at an appropriate interval, and suppresses the influence of impulse noise generated when the logical value is reversed.

Figure 2:
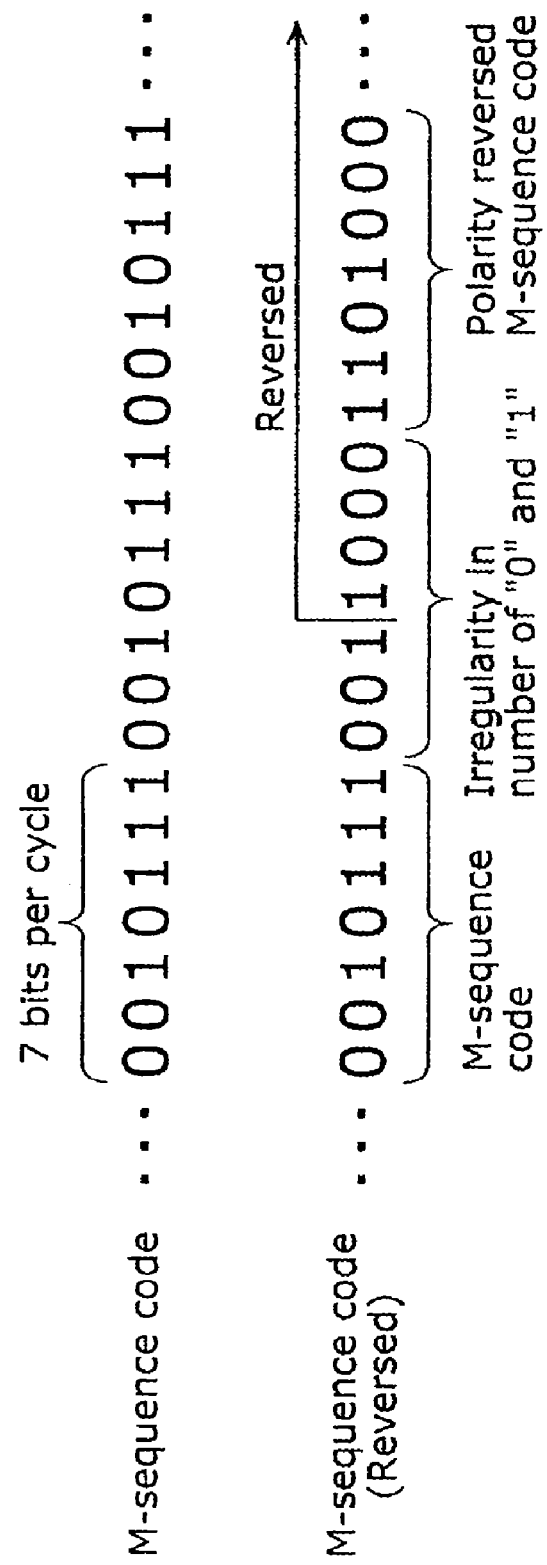
FIG. 2 is a diagram showing an example of the reversed M-sequence codes.
Figure 3:
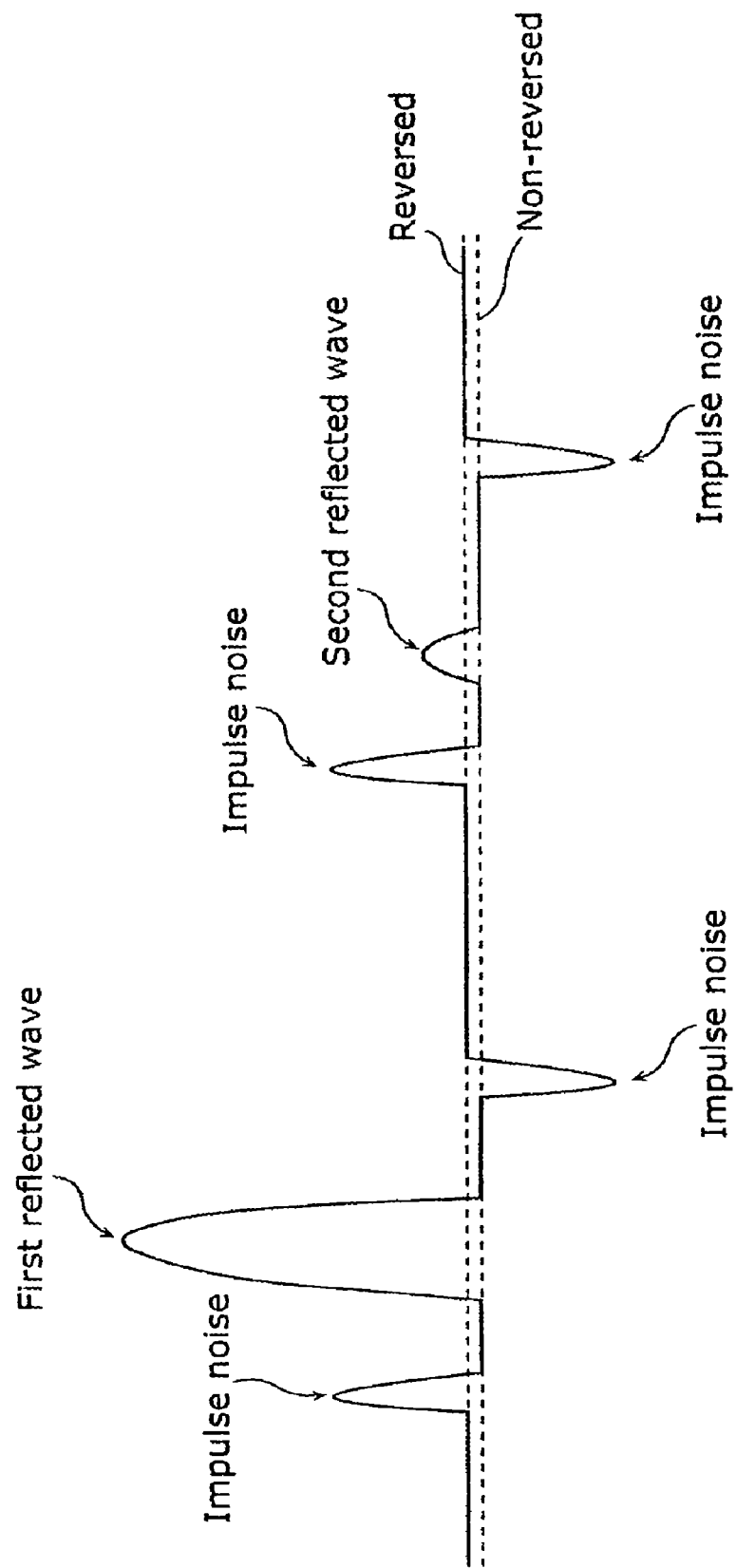
FIG. 3 is an example of impulse noise.
Figure 4:
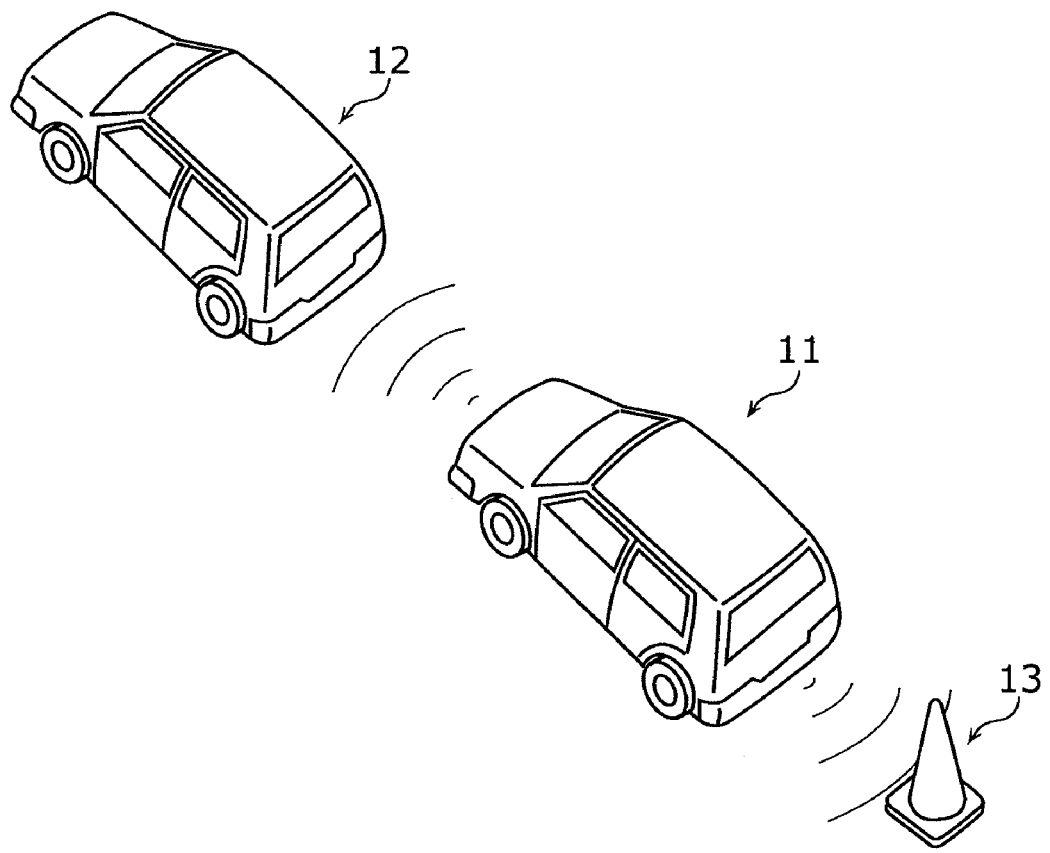
FIG. 4 schematically shows external appearance of the vehicle having the spread spectrum radar apparatus according to the embodiment.

The embodiment of the present invention is described hereafter with reference to the drawings. The spread spectrum radar apparatus according to this embodiment is provided in the front and tail of a vehicle 11 as shown in FIG. 4, and outputs detection waves. The spread spectrum radar apparatus then receives detection wave reflected from objects such as a preceding vehicle 12 or an obstacle 13, and computes existence of an object, distance to the object, and relative velocity.

Figure 5:
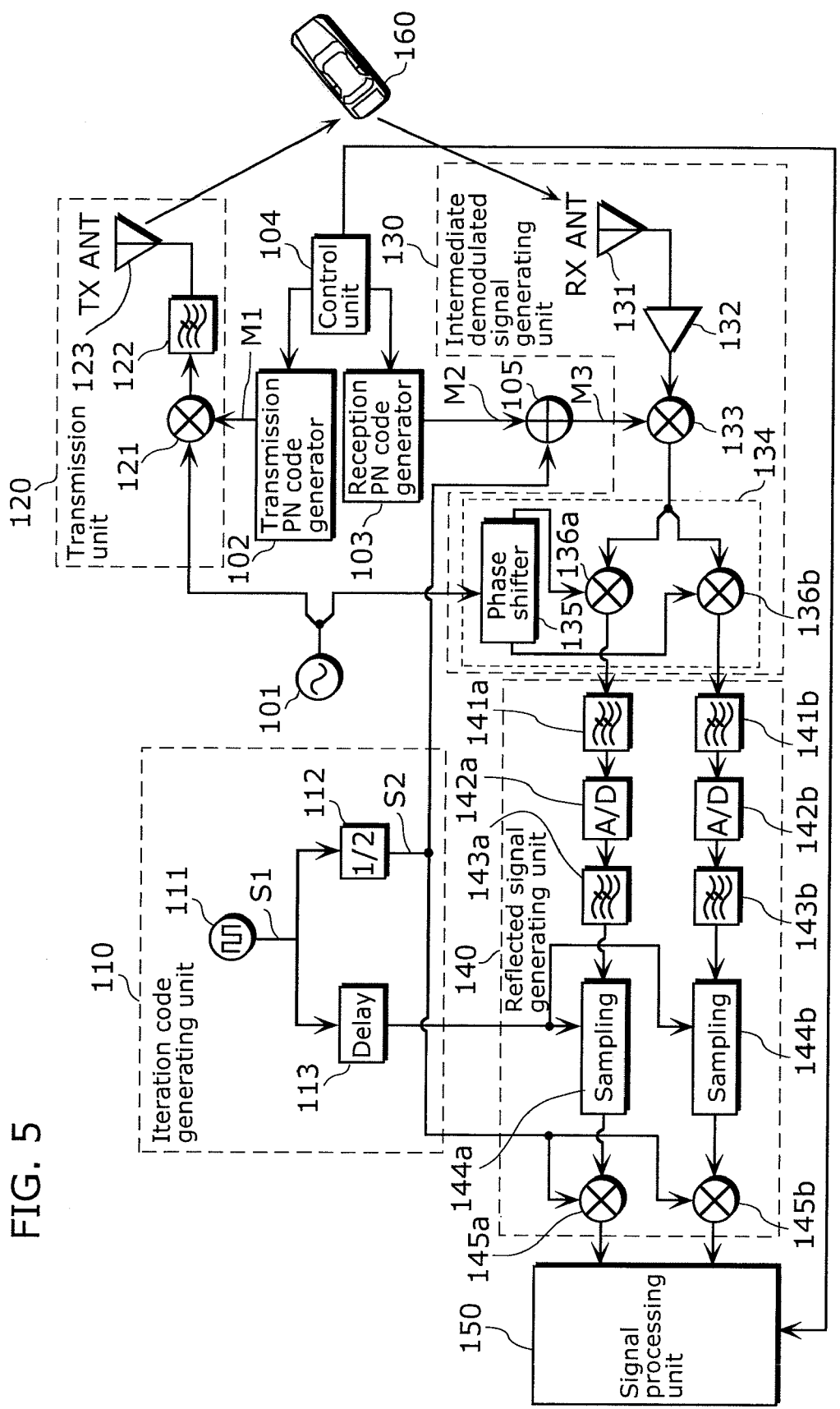
FIG. 5 shows the configuration of the spread spectrum radar apparatus according to the embodiment.

FIG. 5 shows the configuration of the spread spectrum radar apparatus according to this embodiment.

The spread spectrum radar apparatus in FIG. 5 includes a carrier wave oscillator 101, a transmission PN code generator 102, a reception PN code generator 103, a control unit 104, an exclusive OR operation unit 105, an iteration code generating unit 110, a transmission unit 120, a intermediate demodulated signal generating unit 130, a reflected signal generating unit 140, and a signal processing unit 150.

The carrier wave oscillator 101 generates a carrier wave. The frequency of carrier wave is, for example, 26 GHz.

The transmission PN code generator 102 generates a PN code used for spreading in the transmission unit 120 (hereinafter referred to as code M1). Here, the M-sequence code is used as an example of the PN code.

The reception PN code generator 103 generates a PN code used for despreading in the intermediate demodulated signal generating unit 130 (hereinafter referred to as code M2). Note that the code M2 is the code M1 delayed by the delay amount determined by the control unit 104.

In this embodiment, the transmission PN code generator 102 and the reception PN code generator 103 respectively include 11-stage linear feedback shift register, and generate an M-sequence code having an iteration cycle of 2047 bits.

The control unit 104 determines the delay amount above, and outputs the delay amount to the reception PN code generator 103 and the signal processing unit 150.

The exclusive OR operation unit 105 outputs a PN code (hereinafter referred to as code M3), the logical value of which is a reversed logical value of the code M2 according to the iteration code generated in the iteration code generating unit 110. More specifically, in the period where the logical value of the iteration code is "0", the logical value of the code M2 is retained, whereas in the period where the logical value of the iteration code is "1", the logical value of the code M2 is reversed.

The iteration code generating unit 110 generates codes repeating two logical values, "0" and "1". The iteration code generating unit 110 includes the clock signal generator 111, the ½ frequency divider 112 and the delaying unit 113.

Figure 6A:
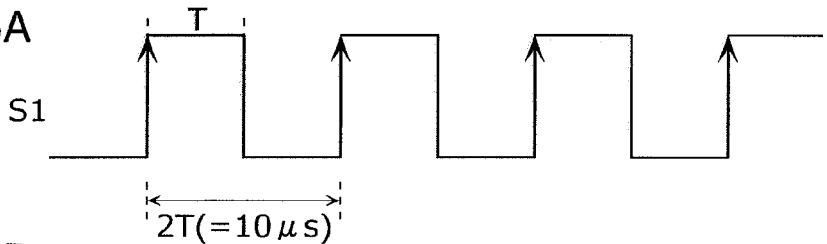
FIG. 6A shows a clock signal generated by the clock signal generator.

The clock signal generator 111 generates a clock signal whose frequency is 100 kHz (hereinafter referred to as signal S1) as shown in FIG. 6A.

Figure 6B:
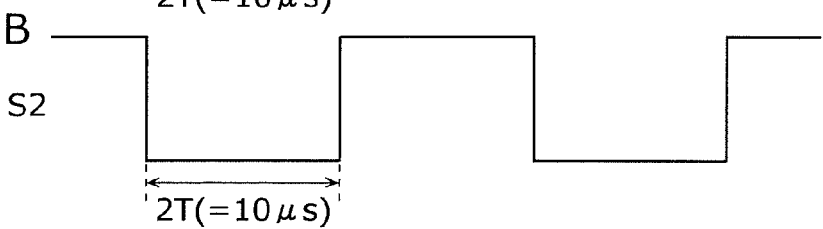
FIG. 6B shows a signal which is obtained by dividing the frequency of the clock signal into half.

The ½ frequency divider 112 divides the frequency of input signal into half and outputs the divided signal. In the example according to the present invention, the clock signal of 100 kHz generated by the clock signal generator 111 is divided, and a clock signal of 50 kHz shown in FIG. 6B is outputted. The signal S2 denotes the iteration code described above.

The delaying unit 113 delays the signal S1 for the delay time of the quadrature demodulation unit 134 (to be described later) and the time period necessary for internal processing of the reflected signal generating unit 140. The internal processing of the reflected signal generating unit 140 is process by a low-pass filter 141a or 141b, an analog digital converter 142a or 142b, and the low-pass filter 143a or 143b.

The transmission unit 120 spreads the carrier wave generated in the carrier wave oscillator 101 using the code M1, and transmits the spread signal as a detection wave. The transmission unit 120 includes a balanced modulator 121, a bandwidth filter 122, and a transmission antenna 123.

The balanced modulator 121 spreads the carrier wave using the code M1.

The bandwidth filter 122 removes unnecessary frequency component from the signal spread by the balanced modulator 122. Note that the process by the bandwidth filter 122 may be performed as necessary, and may not be necessarily performed.

The transmission antenna 123 transmits a spread signal obtained from the bandwidth filter 122 as detection wave.

The intermediate demodulated signal generating unit 130 despreads the received detection wave, and generates an intermediate demodulated signal by quadrature-modulating the despread signal based on the carrier wave. The intermediate demodulated signal generating unit 130 includes a reception antenna 131, an amplifier 132, the balanced modulator 133 and a quadrature-demodulation unit 134.

The reception antenna 131 receives detection wave reflected from a reflection object 160.

The amplifier 132 amplifies the signal received by the reception antenna 131.

The balanced modulator 133 despreads the amplified reception signal using the code M3.

The quadrature-demodulation unit 134 quadrature-demodulates the despread signal based on the carrier wave generated in the carrier wave oscillator 101. The quadrature-demodulation unit 134 includes the phase shifter 135 and the balanced modulator 136a and 136b.

The phase shifter 135 outputs two signals with a phase difference of 90 degrees based on the carrier wave generated in the carrier wave oscillator 101.

Figure 6C:
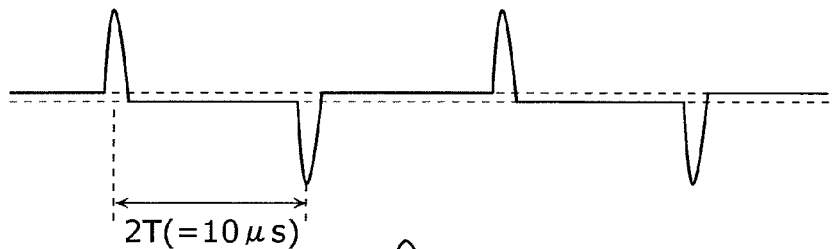
FIG. 6C shows an intermediate demodulated signal having impulse noise.

The balanced modulator 136a and 136b outputs an intermediate demodulated signal obtained by quadrature-demodulation of the despread reception signal using two carrier waves outputted from the phase shifter 135. The intermediate demodulated signal of the same phase as the carrier wave is referred to as an in-phase signal, while the intermediate demodulated signal of a phase different from the carrier wave by 90 degrees is referred to as a quadrature signal. The balanced modulator 136a outputs the in-phase signal, and the balanced modulator 136b outputs the quadrature signal. FIG. 6C shows an example of the in-phase signal or the quadrature signal.

The reflected signal generating unit 140 generates a reflected signal whose impulse noise is removed through processing the intermediate demodulated signal. The reflected signal generating unit 140 includes the low-pass filters 141a, 141b, 143a, and 143b, the analog-digital converters 142a and 142b, the sampling units 144a and 144b, and multiplication units 145a and 145b.

Note that the low-pass filter 141b has the same configuration as the low-pass filter 141a. The difference is that the in-phase signal is inputted to the low-pass filter 141a, while the quadrature signal is inputted to the low-pass filter 141b. Similarly, the analog-digital converter 142b, the low-pass filter 143b, the sampling unit 144b and the multiplication unit 145b respectively have the same configurations as the analog-digital converter 142a, the low-pass filter 143a, the sampling unit 144a and the multiplication unit 145a. For that reason, descriptions for the analog-digital converter 142a, the low-pass filter 143a, the sampling unit 144a and the multiplication unit 145a are mainly made hereafter, while descriptions for the analog-digital converter 142b, the low-pass filter 143b, the sampling unit 144b and the multiplication unit 145b are omitted.

The low-pass filter 141a is an anti-aliasing filter for preventing generation of folding noise upon analog-digital conversion. The low-pass filter 141a suppresses the frequency component over 1/2×Fs included in the in-phase signal when the sampling frequency of the analog-digital converter 142a is Fs.

The analog-digital converter 142a converts the in-phase signal passed through the low-pass filter 141a into numeric data at the sampling frequency Fs.

Figure 6D:
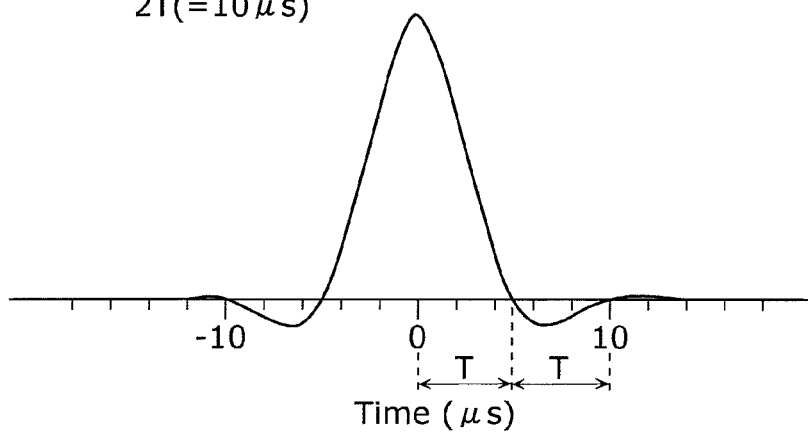
FIG. 6D shows an example of impulse response from the low-pass filter.

The low-pass filter 143a is a filter for suppressing the impulse noise included in the digitalized in-phase signal. FIG. 6D shows an example of impulse response of the low-pass filter 143a. When the cycle of the signal S1 is 2 T, the response value is finite when the time is 0. Furthermore, the absolute value of the response is 0 at a point in time where t=±nT, when n is a natural number. This denotes, for example, an impulse response of a raised-cosine filter fulfilling a condition of a Nyquist filter when the sampling frequency is 1/T.

The sampling unit 144a obtains an ideal sampling value with suppressed influence of the impulse noise by sampling the in-phase signal passed through the low-pass filter 143a after synchronizing the cycle of in-phase signal with the reversal cycle of the code M2, more specifically, the cycle of the signal S1.

The multiplication unit 145a multiplies the obtained sampling value by the iteration code which is an output of the ½ divider 112. This allows recovery of original reflected signal from the alternated reflected signal.

The signal processing unit 150 computes the distance to the reflection object and relative velocity by processing the reflected signal generated in the reflected signal generating unit 140. More specifically, processing such as synthesis of the in-phase signal and the quadrature signal is performed by further limiting the frequency of reflected signal and eliminating the unnecessary frequency component. Furthermore, the signal processing unit 150 computes the distance to the object and relative velocity by receiving information such as delay amount set to the reception PN code generator 103.

Next, the operation of the spread spectrum radar apparatus according to this embodiment is described, focusing on the operation after the reception of reflected wave from the object. More specifically, the operations of the intermediate demodulated signal generating unit 130 and the reflected signal generating unit 140 are described.

The reflection object 160 reflects detection wave from the transmission antenna 123. The reception antenna 131 receives the reflected wave. The amplifier 132 amplifies the reflected wave and outputs the reflected wave to the balanced modulator 133. The balanced modulator 133 despreads the reflected wave using the code M3. As described above, FIG. 6C shows an example of a signal obtained by quadrature-demodulating despread reflected wave. An impulse noise is generated in the instant when the logical values of the signal S2 are reversed, due to temporary irregularity of the numbers of "0" and "1" in the code M3.

As shown in FIG. 6C, amplitude component determined by the correlation characteristics of the original PN code is generated in the part with no impulse noise. Therefore, better undesired wave suppression ratio may be obtained by extracting the amplitude component only. The undesired wave suppression ratio is a ratio of amplitude of undesired wave to the desired wave. Large undesired wave suppression ratio indicates an ideal radar apparatus. Note that the desired wave is detection wave having round-trip propagation delay time equal to the time lag of the code M1 and the code M2. Note that the undesired wave is detection wave having round-trip propagation delay time not equal to the time lag of the code M1 and the code M2.

The desired wave shows strong correlation output according to the autocorrelation characteristic of the PN code. Here, when the number of bits in one cycle of PN code is N, the amplitude of the undesired wave is 1/N of the amplitude of the desired wave. More specifically, the undesired wave suppression ratio at 20×log N (dB) is obtained. In this embodiment, it is assumed that N=2047, and the undesired wave suppression ratio is approximately 66 dB.

The impulse noise needs to be suppressed in order to gain a better undesired wave suppression ratio. Thus, the low-pass filter 143a filters the numeric data indicating the output the in-phase signal from the analog-digital converter 142a.

Figure 6E:
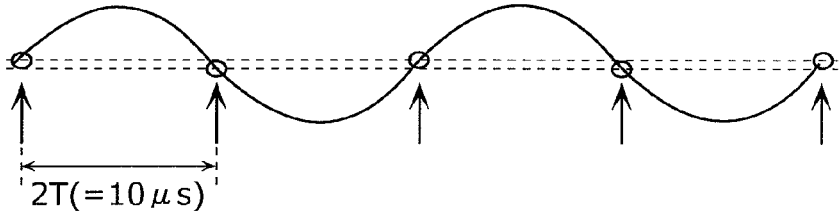
FIG. 6E shows an output waveform passed through the low-pass filter.

This allows overlap of impulse noise generated immediately after the point in time where the logical value of signal S2 changes and local minimum point of the absolute value of impulse response from the low-pass filter. FIG. 6E shows output of the low-pass filter 143a.

Figure 6F:
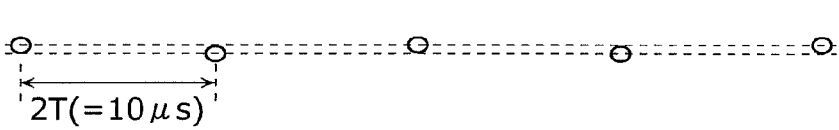
FIG. 6F shows sampled output waveform by the sampling unit.

The sampling unit 144a samples output waveform shown in FIG. 6E. Here, the delaying unit 113 delays the signal S1 for the period from the quadrature-demodulation by the quadrature-demodulation unit 134 to the suppression of impulse noise by the low-pass filter 143a. More specifically, the sampling unit 144a samples the output waveform of the low-pass filter 143a at the timing shown in the arrows in FIG. 6E. FIG. 6F shows the sampling value obtained in the process.

The multiplication unit 145a restores the alternated reflected signal to the original signal by multiplying the signal S2 with the sampling value obtained in the sampling unit 144a.

As described above, the low-pass filter 143a of the spread spectrum radar apparatus according to this embodiment suppresses the impulse noise generated in the despread signal when reversing the signal S2. Furthermore, sampling by the sampling unit 144a at the timing when the influence of the impulse noise is small suppresses the impulse noise.

Although only an exemplary embodiment of the spread spectrum radar apparatus according to the present invention has been described in detail above, those skilled in the art will readily appreciate that many modifications are possible in the exemplary embodiments without materially departing from the novel teachings and advantages of this invention. Accordingly, all such modifications are intended to be included within the scope of this invention.

Figure 7:
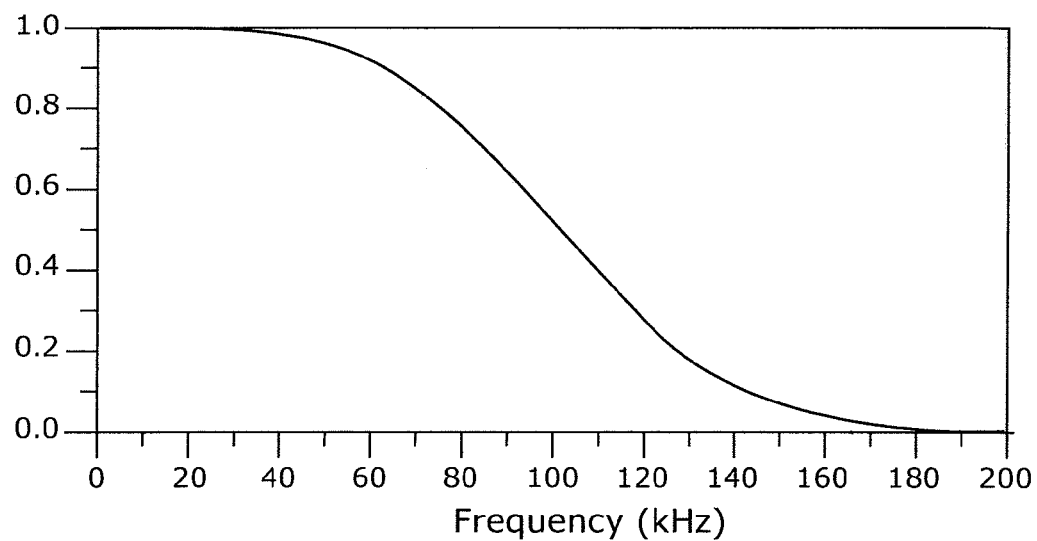
FIG. 7 shows frequency characteristics when a raised-cosine filter is used as the low-pass filter.

For example, a raised-cosine filter may be used as the low-pass filter 143a. The frequency characteristic in this case is low-pass characteristic with a frequency twice more than the frequency of the signal 52 as shown in FIG. 7, which is 100 kHz.

This allows the basic frequency component of the signal S2 included in the intermediate demodulated signal whose polarity reverses at a cycle same as the frequency of the signal S2 to pass without damage. Thus, it is possible to suppress high frequency component generated due to spread signals by undesired wave, and unnecessary signals generated by thermal noise, and interference wave.

Figure 8A:
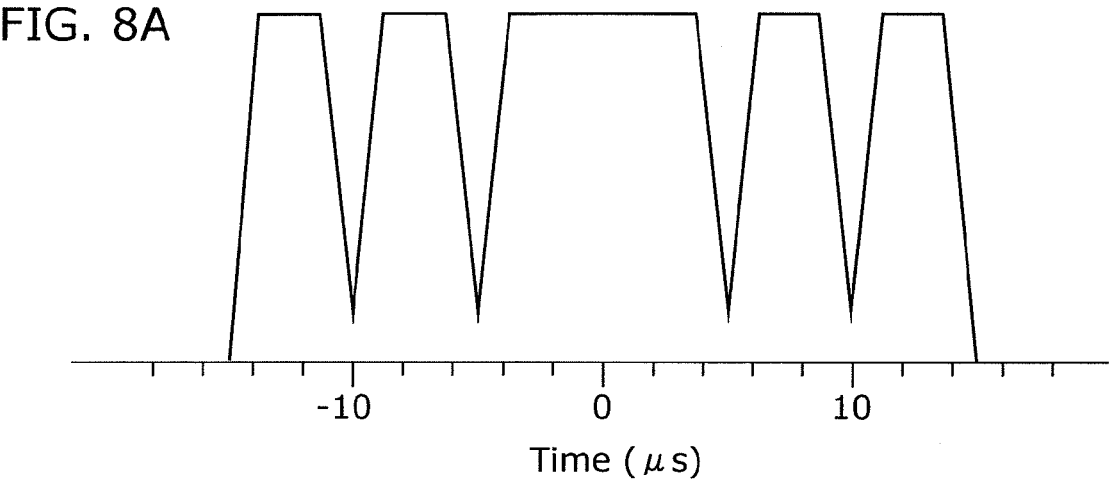
FIG. 8A shows an example of impulse response from the low-pass filter.
Figure 8B:
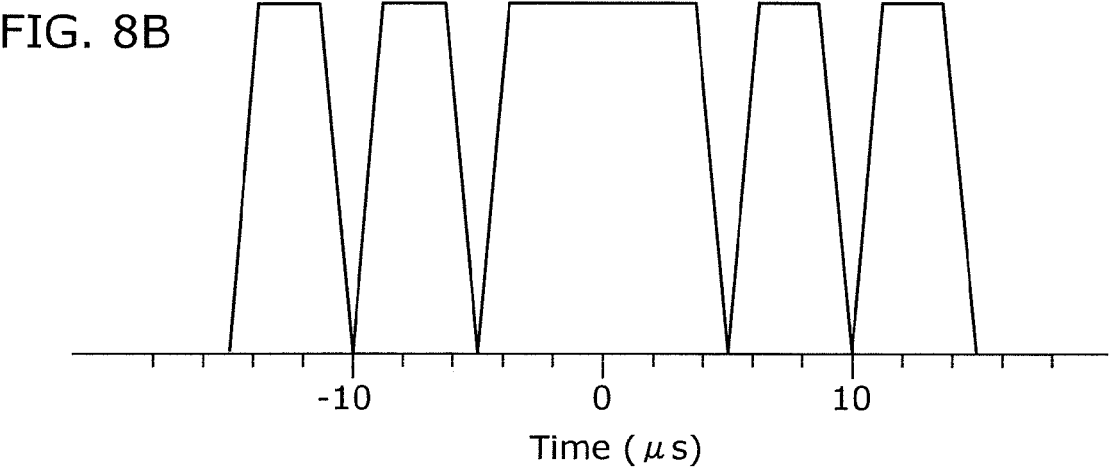
FIG. 8B shows an example of impulse response from the low-pass filter.

As shown in a filter with which the absolute value of the impulse response is local minimum or 0, as shown in FIGS. 8A and 8B, in the proximity of time $t=\pm nT$ when the cycle of the signal S1 is 2 T, as the low-pass filter 143a. Note that the proximity of the time $t=\pm nT$ is a range $\pm nT-T/10 < t < \pm nT+T/10$.

Figure 9:
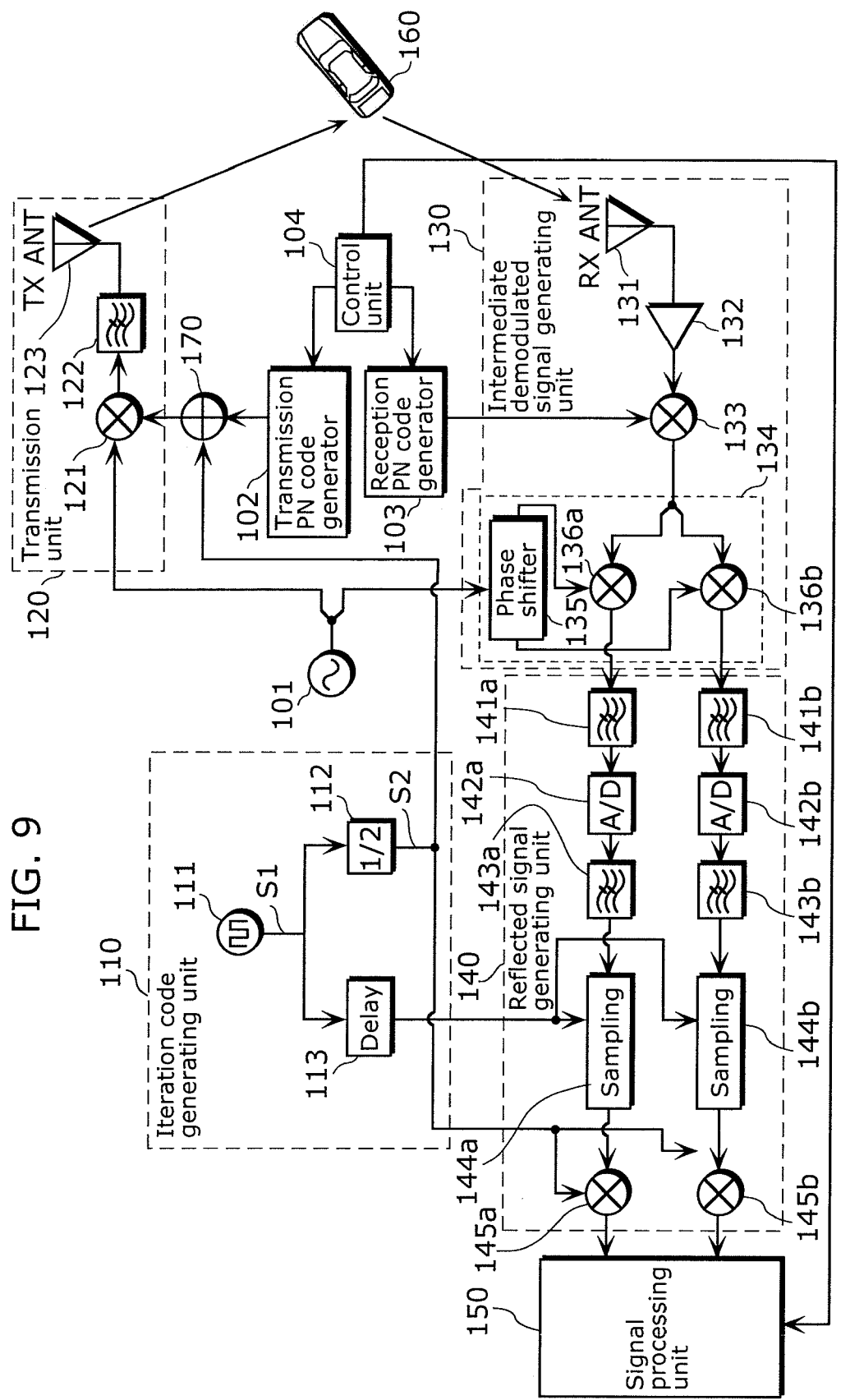
FIG. 9 shows a configuration including an exclusive OR operation unit on the transmission side.

Furthermore, although the polarity of the reception PN code is reversed using the iteration code in the embodiment, the polarity of the transmission PN code may be reversed using the iteration code. FIG. 9 shows the configuration of the spread spectrum radar apparatus when reversing the polarity of the transmission PN code. The spread spectrum radar apparatus in FIG. 9 is different from the radar apparatus in FIG. 5 in that an exclusive OR operation unit 170 is provided between the transmission PN code generator 102 and the balanced modulator 121 instead of the exclusive OR operation unit 105.

In this case, ideal undesired wave suppression ratio can be obtained by having the same configuration of the reflected signal generating unit 140. However, it is preferable to vary the delay amount of the delaying unit 113 synchronizing the delay amount set in the reception PN code generator 103 since the reversal timing of the polarity of the intermediate demodulated signal varies depending on the distance of the reflection object.

In addition, although M-sequence PN code is used as the pseudo noise code in this embodiment, Gold code may also be used.

Furthermore, although the code whose polarity is reversed at a constant interval is used as the iteration code in the embodiment, the iteration code may be a data code which is a code with information. In this case, a data generator that generates bits of data code for each cycle of the clock signal generator 111 may be used instead of the ½ divider 112.

Furthermore, by digitalizing the intermediate demodulated signal in the analog-digital converter 142a and inputting the digitalized intermediate demodulated signal to the low-pass filter 143a configured as a digital filter, the conditions shown in FIGS. 6D, 8A, and 8B.

However, use of the finite impulse response digital filter after digitalization of the intermediate demodulated signal is not always necessary, and an analog filter can achieve an ideal undesired wave suppression ratio when impulse response fulfills the conditions described above. In this case, the low-pass filter 141a and the analog-digital converter 142a are not necessary.

Note that the polarity and the amplitude of impulse noise is dependent on which phase of the PN code in one cycle matches the timing of reversal of the polarity of iteration code. This is due to the difference of the number of "0" and "1" before and after the polarity reversal of PN codes depending on the phase in which the polarity reversal of the PN code occurs. When the integral multiple of one cycle of PN code and one cycle of the iteration code do not match, regular waveforms as shown in FIG. 6C are not generated. Even in these cases, the configuration of the present invention can provide an advantageous effect that enables obtainment of an ideal undesired wave suppression ratio.

INDUSTRIAL APPLICABILITY

The present invention is useful for an in-vehicle radar apparatus equipped in a vehicle, which detects preceding vehicle and obstacles in the back.

What is claimed is:

1. A spread spectrum radar apparatus which detects an object by transmitting and receiving a spread signal obtained by spectrum-spreading, said spread spectrum radar apparatus comprising:

an oscillating unit configured to generate a carrier wave;

a code reversal unit configured to output a second pseudo noise code that has a cyclically reversed logical value of a first pseudo noise code;

a transmission unit configured to transmit a spread signal which is the carrier wave that has been spread using one of the first pseudo noise code and the second pseudo noise code;

an intermediate demodulated signal generating unit configured to receive a reflected wave which is the spread signal reflected from the object after the spread signal is transmitted by said transmission unit, and to despread the reflected wave using a code which is delayed code of the other one of the first pseudo noise code and the second pseudo noise code, to generate an intermediate demodulated signal;

a filter through which a specific frequency component of the intermediate demodulated signal passes; and a sampling unit configured to sample an output signal from said filter, wherein said sampling unit is configured to sample the output signal in synchronization with the cycle of the reversal.

2. The spread spectrum radar apparatus according to claim 1, further comprising:

a clock generator which generates a clock signal; and a frequency divider which generates an iteration code by dividing the frequency of the clock signal into half, wherein said code reversal unit is configured to reverse the first pseudo noise code according to the logical value of the iteration code to output the second pseudo noise code, and said sampling unit is configured to sample the output signal in synchronization with the clock signal.

3. The spread spectrum radar apparatus according to claim 2, further comprising a delaying unit configured to delay the clock signal, wherein said delaying unit is configured to delay the clock signal for a period in which processing by said filter is performed and output the delayed clock signal to said sampling unit, and said sampling unit is configured to sample the output signal in synchronization with the delayed clock signal.

4. The spread spectrum radar apparatus according to claim 2, wherein said filter has a characteristic that an impulse response takes a finite value when time $t=0$, and that the absolute value of $\pm nT-T/10 < t < \pm nT+T/10$ is local minimum, where n is a natural number and where the half of the clock signal is T.

5. The spread spectrum radar apparatus according to claim 4, wherein said filter is a Nyquist filter whose sampling frequency is a frequency twice as much as the frequency of the clock signal.

6. The spread spectrum radar apparatus according to claim 5, wherein said filter is a raised cosine filter.

7. The spread spectrum radar apparatus according to claim 1, further comprising
an analog-digital converter which converts the intermediate demodulated signal which is an analog signal into a digital signal, at a predetermined sampling frequency,
wherein said filter is an finite impulse response digital filter.

8. The spread spectrum radar apparatus according to claim 7, further comprising
a low-pass filter whose cutoff frequency is a half of the sampling frequency,
wherein said analog-digital converter converts the intermediate demodulated signal which passed through said low-pass filter into the digital signal.

9. A vehicle comprising
a spread spectrum radar apparatus which detects an object by transmitting and receiving a spread signal obtained by spectrum-spreading, the spread spectrum radar apparatus including:
an oscillating unit configured to generate a carrier wave;
a code reversal unit configured to output a second pseudo noise code that has a cyclically reversed logical value of a first pseudo noise code;
a transmission unit configured to transmit a spread signal which is the carrier wave that has been spread using one of the first pseudo noise code and the second pseudo noise code;
an intermediate demodulated signal generating unit configured to receive a reflected wave which is the spread signal reflected from the object after the spread signal is transmitted by the transmission unit, and to despread the reflected wave using a code which is delayed code of the other one of the first pseudo noise code and the second pseudo noise code, to generate an intermediate demodulated signal;
a filter through which a specific frequency component of the intermediate demodulated signal passes; and
a sampling unit configured to sample an output signal from the filter,
wherein the sampling unit is configured to sample the output signal in synchronization with the cycle of the reversal.

10. A control method for a spread spectrum radar apparatus which detects an object by transmitting and receiving a spread signal obtained by spectrum-spreading, said control method comprising:
generating a carrier wave;
outputting a second pseudo noise code that has a cyclically reversed logical value of a first pseudo noise code;
transmitting a spread signal which is the carrier wave that has been spread using one of the first pseudo noise code and the second pseudo noise code;
receiving a reflected wave which is the spread signal reflected from the object after the spread signal is transmitted in said transmitting;
generating an intermediate demodulated signal by despreading the reflected wave using a code which is delayed code of the other one of the first pseudo noise code and the second pseudo noise code; and
sampling an output signal including a specific frequency component of the intermediate demodulated signal passed through,
wherein in said sampling, the output signal is sampled in synchronization with the cycle of the reversal.

* * * * *